Sept. 20, 1949.　　　　A. E. MILLER　　　　2,482,428
MAGNETIC BRAKE
Filed June 10, 1947

INVENTOR.
Albert E. Miller,
BY Dybvig & Dybvig,
His Attorneys.

Patented Sept. 20, 1949

2,482,428

UNITED STATES PATENT OFFICE 2,482,428

MAGNETIC BRAKE

Albert E. Miller, Dayton, Ohio

Application June 10, 1947, Serial No. 753,679

11 Claims. (Cl. 242—84.5)

This invention relates to a fishing reel and more particularly to an improved type of reel having a compensated magnetic brake means for preventing backlash or overrunning of the spool.

An object of this invention is to provide a reel which is inexpensive to manufacture and which is durable and troublefree in operation.

Still another object of this invention is to provide an improved form of magnetic brake having spring means for modifying the brake action.

A further object of this invention is to provide a fishing reel which is smooth in operation and which is readily adjustable to desired degrees of drag or braking effect.

Further objects and advantages of the present invention reside in the construction and combination of parts and in the mode of operation as will be apparent from the following description, reference being had to the accompanying drawings wherein a preferred form of the present invention is clearly shown.

The problem of preventing backlash or overrunning of the fishing reel spool and consequent tangling of the line during casting is known to all who have tried fishing with a rod and reel and a large number of constructions have been proposed which have solved the problem with varying degrees of success. Many of the prior constructions have involved the use of expensive and fragile mechanisms and many of the mechanisms have been wholly inadequate or have necessitated the use of skills which most people do not have time to acquire or are unable to acquire. In order to be practical, it is important that the mechanism be both durable and inexpensive and that there be a braking action which is completely automatic so that even children can operate the reel without backlash or overrunning of the spool. The apparatus described hereinafter is believed to meet the above requirements.

Figure 4:
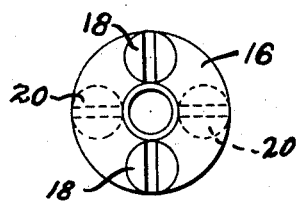
Figure 4 is a side view of the hub portion of the spool.
Figure 1:
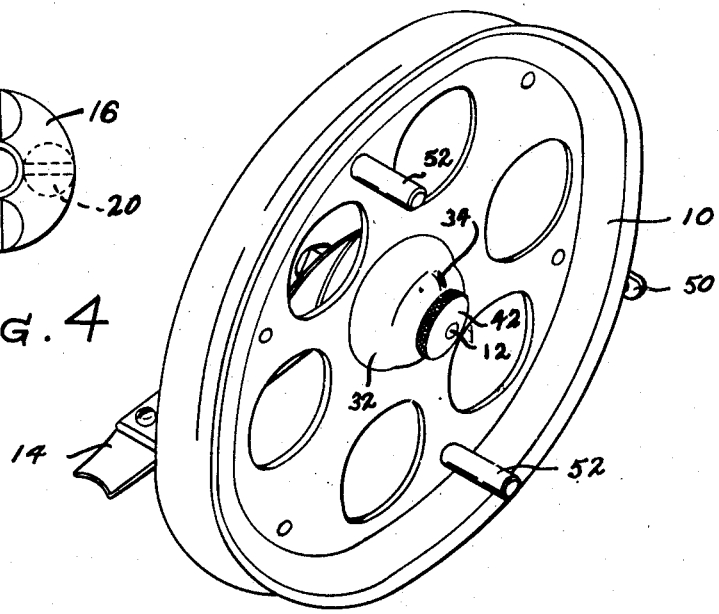
Figure 1 is a perspective view of a fishing reel embodying my invention.
Figure 3:
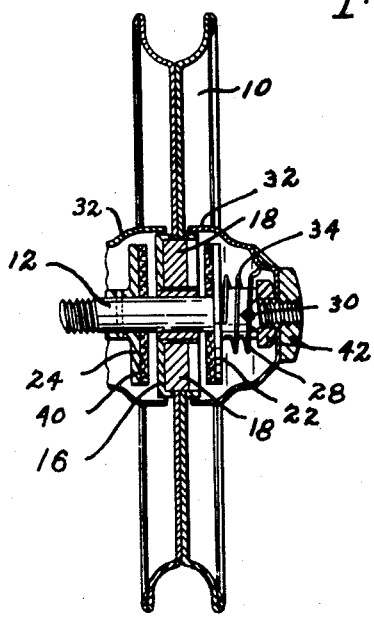
Figure 3 is a vertical sectional view showing the arrangement of the parts when the spool portion of the reel is rotating.

Referring now to the drawings wherein I have shown an improved fishing reel mechanism, reference numeral 10 designates a spool which is rotatably supported on the stationary shaft 12 which in turn in non-rotatably secured to a conventional reel mounting bracket 14. The spool 10 is fixed to a specially constructed hub 16 which supports a first pair of permanent magnets 18 arranged to face in the one direction and a second pair of similar magnets 20 arranged to project in the opposite direction. These magnets may be held in place in any suitable manner within recesses provided in the opposite side faces of the hub 16. The opposite side faces of the hub 16 serve as brake surfaces which frictionally cooperate with the felt washers 40 carried by the discs 22 and 24, as explained more fully hereinafter. For purposes of illustration, I have shown the magnets as comprising a cylindrical body which is slotted at the one end so as to form a pair of poles of opposite polarity. The magnets 18 and 20 revolve with the spool 10 during casting and serve to set up eddy currents in the side discs 22 and 24 in accordance with well known principles. The disc 24 is fixed on the shaft 12 but the hub 16 and disc 22 are slidably supported on the stationary shaft 12 so that upon rotation of the magnets carried by the hub 16 there will be a tendency on the part of the disc 22 and the hub 16 to shift sidewise on the shaft 12 due to the magnetic repulsion which will tend to space the elements as shown in an exaggerated manner in Figure 3 of the drawing. The spool will rotate anti-clockwise, as viewed in Figure 1, during the casting operation.

Figure 2:
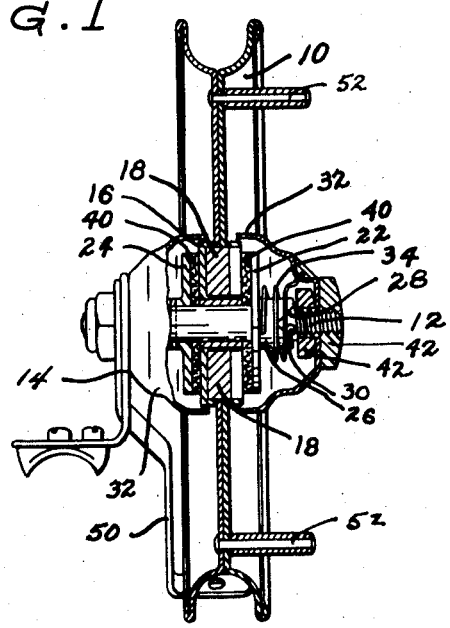
Figure 2 is a vertical sectional view showing the arrangement of the parts when the spool portion of the reel is stationary.

As best shown in Figure 2 of the drawing, the disc 22 is provided with a projecting hub or flange 26 which is provided with a cam notch 28 which cooperates with a stationary pin or cam 30 carried by the shaft 12. A pair of end bells 32 inclose the hub structure of the spool and the discs 22 and 24 in the manner indicated. A torsion spring 34 which has its one end anchored to the adjacent end bell 32 and has its other end anchored to the hub portion 26 tends to exert a rotational force on the disc 22 and the associated hub portion 26 so that the pin 30 acting on the cam surfaces formed by the inclined sides of the notch 28 serves to cam the disc 22 towards the side of the hub 16 so as to increase the friction between the plates 22 and 24 and the hub 16. The eddy currents generated in the discs exert a braking action on the magnets when the spool is rotating at higher rates of speed even though the discs or the felt washers 40 do not frictionally engage the sides of the hub 16.

For purposes of illustration, I have shown the discs 22 and 24 held in spaced relationship to the sides of the spool hub 16 by means of felt washers 40 secured to the discs 22 and 24. Instead of the felt washer 40 any other suitable washer may be used as for example a washer made from synthetic rubber.

A pair of nuts 42 and 44 are provided on the one end of the stationary shaft 12 for adjustably holding the end bell 32 in place. By loosening the nut 42, it is possible to rotate the end bell 32 relative to the shaft 12, so as to adjust the tension on the spring 34. This then serves as one means for adjusting the braking effect of the discs on the hub 16.

The effect of the magnets 18 and 20 on the discs 22 and 24 when the spool is rotating at its normal speed of approximately 1200 revolutions per minute, is such that the discs are repelled by the magnets and the distance between the discs increases and the braking effect decreases. As the speed of the spool increases, the effect of the tension of the spring in causing engagement of the brake becomes less and as the speed of the spool decreases the spring then acts as a governor as the momentum of the spool dies down. When the spool is not in motion the discs 22 and 24 acting through the felt washers 40 frictionally hold the spool 10 with a force strong enough to start a hard cast without the necessity for applying thumb pressure to the spool at the beginning of the cast as is commonly required in other types of reels. By virtue of the above described arrangement the spring 34 in combination with the cam elements 28 and 30 automatically modify the brake action resulting from the magnetic action.

For purposes of illustration, I have shown four magnets whereas any number of magnets could be used so long as they are capable of producing the desired effect. A fish line guide 50 and operating cranks or handles 52 are provided as shown and serve their usual function.

While the form of embodiment of the invention as herein disclosed, constitutes a preferred form, it is to be understood that other forms might be adopted, all coming within the scope of the claims which follow.

Having thus described my invention, I claim:

1. In a fishing reel, a shaft, a spool supported for rotation on said shaft, permanent magnets carried by said spool, said spool having a friction brake surface formed thereon, a disc supported on said shaft for axial movement relative to said spool and having a complementary friction brake surface arranged for engagement with said first named brake surface, said disc comprising a metallic portion arranged in the magnetic field of said permanent magnets whereby upon relative rotation of said disc and said magnets eddy currents are generated in said metallic portion and said disc is repelled away from the spool so as to disengage said brake surfaces.

2. In a fishing reel, a shaft, a spool supported on said shaft, permanent magnets carried by said spool, said spool having a brake surface formed thereon, a disc supported on said shaft and having a brake surface cooperating with said first named brake surface, said disc and said spool being mounted for relative axial movement, said disc comprising a metallic portion arranged in the magnetic field of said permanent magnets whereby upon relative rotation of said disc and said magnets eddy currents are generated in said metallic portion and said disc is repelled away from said spool, said disc having a cam surface provided thereon, and a complementary cam carried by said shaft and arranged to cam said disc in an axial direction relative to said spool upon relative rotation between said disc and said shaft.

3. In a fishing reel, a shaft, a spool supported on said shaft, permanent magnets carried by said spool, said spool having a brake surface formed thereon, a disc supported on said shaft and having a brake surface cooperating with said first named brake surface, said disc and said spool being mounted for relative axial movement, said disc comprising a metallic portion arranged in the magnetic field of said permanent magnets whereby upon relative rotation of said disc and said magnets eddy currents are generated in said metallic portion and said disc is repelled away from said spool, said disc having a cam surface provided thereon, and a complementary cam carried by said shaft and arranged to cam said disc in an axial direction relative to said spool upon relative rotation between said disc and said shaft, and spring means arranged to cause relative rotation between said disc and said shaft.

4. In a fishing reel, a shaft, a spool supported for rotation on said shaft and having a hub portion, permanent magnets carried by said hub portion, said hub portion having a brake surface formed thereon, a disc supported on said shaft and having a brake surface cooperating with said first named brake surface, said disc comprising a metallic portion arranged in the magnetic field of said permanent magnets whereby upon relative rotation of said disc and said magnets said disc will be repelled from said hub portion, said disc having an axially extending flange provided with a cam surface thereon, a complementary cam carried by said shaft and arranged to shift said disc in an axial direction upon relative rotation between said disc and said shaft, and spring means arranged to cause relative rotation between said disc and said shaft, and means for adjusting the tension of said spring means so as to regulate the braking effect between said disc and said hub portion.

5. In a combined electromagnetic and friction brake device, a pair of relatively rotatable units, means for supporting said units for relative axial movement into and out of frictional engagement with one another, the first of said units comprising means for establishing a magnetic field and the second of said units comprising a metallic member movable through said magnetic field whereby eddy currents are set up in said metallic member and said units repel one another, and means including a cam for forcing said units into frictional engagement in response to a pre-determined degree of relative rotation of said units.

6. In a fishing reel assembly, a stationary shaft, a spool rotatably and slidably supported on said shaft, a first metallic disc fixed to said shaft and having the one side thereof arranged in frictional engagement with a portion of said spool, a second disc slidably and rotatably mounted on said shaft and having one side thereof in frictional engagement with a portion of said spool, housing means enclosing said discs and a portion of said spool, cooperating cam means provided on said shaft and said second disc for forcing said second disc into frictional engagement with a portion of said spool in response to a pre-determined degree of relative rotation between said second disc and said shaft, and a torsion spring having its one end connected to said second disc and having its other end connected to said housing means and tending to rotate said second disc relative to said shaft.

7. In a fishing reel assembly, a stationary shaft, a spool rotatably and slidably supported on said shaft, a first metallic disc fixed to said shaft and having a portion arranged in frictional engagement with a portion of said spool, a second disc slidably and rotatably mounted on said shaft and having a portion thereof in frictional engagement with a portion of said spool, housing means enclosing said discs and a portion of said spool, cooperating cam means provided on said shaft and said second disc for forcing said discs into frictional engagement with said spool in response to relative rotation between said second disc and said shaft, a torsion spring having its one end connected to said second disc and having its other end connected to said housing means and tending to rotate said second disc relative to said shaft, and means for adjustably supporting said housing means relative to said shaft whereby the tension of said spring may be adjusted.

8. In a fishing reel, a shaft, a spool member supported on said shaft, a disc member supported on said shaft, said disc member and said spool member being supported for axial movement and rotational movement relative to one another and having complementary brake surfaces formed thereon adapted to engage one another in response to relative axial movement in the one direction, one of said members having magnet means supported thereon and the other of said members having armature means arranged to move through the magnetic field set up by said magnet means, said magnetic means and said armature means being arranged in axial alignment whereby upon relative rotation of said members magnetic repulsion resulting therefrom causes relative axial movement of said members, and means opposing said last mentioned axial movement.

9. In a fishing reel, a shaft, a spool member supported on said shaft, a disc member supported on said shaft, said disc member and said spool member being supported for axial movement relative to one another and having complementary brake surfaces formed thereon adapted to engage one another in one of said relative positions, one of said members having supported thereon magnet means and the other of said member having armature means arranged to move through the magnetic field set up by said magnet means, said magnet means and said armature means being arranged in axial alignment whereby upon relative rotation of said members the magnetic repulsion produced thereby causes relative axial movement of said members, and means including a cam operable in response to relative rotation of said members for opposing said magnetic repulsion.

10. In a combined electromagnetic and friction brake device, a pair of relatively rotatable units, means for supporting said units for relative axial movement into and out of frictional engagement with one another, the first of said units comprising means for establishing a magnetic field and the second of said units comprising a metallic member movable through said magnetic field whereby eddy currents are set up in said metallic member and said units repel one another, means including a cam for forcing said units into frictional engagement in response to a pre-determined degree of relative rotation of said units, and spring means for inducing relative rotation of said units.

11. In a fishing reel assembly, a stationary shaft, a spool rotatably and slidably supported on said shaft, a first metallic disc fixed to said shaft and having a portion arranged in frictional engagement with a portion of said spool, a second disc slidably and rotatably mounted on said shaft and having a portion thereof arranged for movement into and out of frictional engagement with a portion of said spool, housing means enclosing said discs and a portion of said spool, cooperating cam means provided on said shaft and said second disc for forcing said discs into frictional engagement with said spool in response to relative rotation between said second disc and said shaft, a torsion spring having its one end connected to said second disc and having its other end connected to said housing means and arranged to rotate said second disc relative to said shaft, means for adjustably supporting said housing means relative to said shaft whereby the tension of said spring may be adjusted, bracket means attached to said stationary shaft and adapted to support said reel assembly on a casting rod, and means for guiding the line on said spool comprising an arm having the one end thereof attached to said stationary shaft and having an apertured portion radially spaced from said spool for guiding the line onto said spool.

ALBERT E. MILLER.

REFERENCES CITED

The following references are of record in the file of this patent:

UNITED STATES PATENTS

| Number | Name | Date |
| --- | --- | --- |
| 2,339,919 | Eaton | Jan. 25, 1944 |
| 2,401,256 | Lear | May 28, 1946 |